United States Patent [19]

Johnson

[11] 4,307,808

[45] Dec. 29, 1981

[54] APPARATUS FOR REFINING HERBAGE

[76] Inventor: Laurence J. Johnson, 210 Atlantic Ave., Lynbrook, N.Y. 11563

[21] Appl. No.: 741,207

[22] Filed: Nov. 12, 1976

Related U.S. Application Data

[63] Continuation-in-part of Ser. No. 628,760, Dec. 3, 1975, abandoned.

[51] Int. Cl.³ .................................................. B07C 7/04
[52] U.S. Cl. ...................................... 209/614; 209/675; 209/382; 131/311; 131/325; 241/100; 241/168
[58] Field of Search ................................ 222/189, 196.1; 209/126, 85, 357, 381, 382, 374; 131/146, 120; 241/168, 169, 170, 171, 100

[56] References Cited

U.S. PATENT DOCUMENTS

| | | | |
|---|---|---|---|
| 392,052 | 10/1888 | Mitchell | 241/170 |
| 1,248,081 | 11/1917 | Couch | 209/357 X |
| 1,531,651 | 3/1925 | Geiger | 241/170 |
| 1,542,430 | 6/1925 | Wever | 209/236 X |
| 1,878,924 | 9/1932 | Will | 241/168 |
| 2,511,357 | 6/1950 | Marty | 241/69 |

FOREIGN PATENT DOCUMENTS 228807 2/1925 United Kingdom ...................... 83/9

*Primary Examiner*—Allen N. Knowles
*Attorney, Agent, or Firm*—Ernest F. Marmorek

[57] ABSTRACT

A device for cleaning or refining herbage or herbal substances which operates to separate out twigs, seeds or other roughage by an agitating and straining process. The device includes a cylindrical main body internally divided into a pair of chambers by a fixed strainer or wire screen with a pair of removable end caps enclosing the chambers at each end of the cylinder. A plurality of metallic balls, preferably four, are loosely confined within one of the chambers within which the herbage to be refined is introduced. Vigorous shaking of the device will cause refined herbage to pass from the chamber containing the balls, through the strainer or screen and into the other chamber where the refined herbage may be collected in one of the end caps.

4 Claims, 4 Drawing Figures

APPARATUS FOR REFINING HERBAGE

This application is a continuation-in-part of co-pending prior application Ser. No. 628,760 filed Dec. 3, 1975, now abandoned.

BACKGROUND OF THE INVENTION

The present invention relates generally to apparatus for refining herbage and more particularly to a device which, upon vigorous shaking thereof, may cause herbage contained therein to be separated into a refined portion and a roughage portion containing seeds, twigs or the like which may be discarded. The device of the invention may be hand-held and manually shaken in order to readily separate the roughage from the desirable or refined portion of the herbal substance.

Herbs have a variety of uses. Of course, one of the most widely known herbs is probably marijuana but it will be appreciated that there exist many other herbs ranging from teas used for the preparations of beverages or as health foods to herbs used for smoking. Many of the herbs used for smoking are considered to contain psychoactive substances, nevertheless, these herbs may be freely and legally used without prohibition. A report in the Journal of the American Medical Association indicates that there may be at least 192 herbs commercially available which are used for smoking and which are not legally prohibited.

Furthermore, there has developed a substantial amount of commercial activity involved with the widespread distribution and sale of paraphernalia for use with herbs of various kinds. Such paraphernalia may range from smoking implements to cleaning or refining devices of a type to which the present invention relates.

Indeed, a wide variety of items exist which are useful with many types of herbal substances and the demand and commercial significance of such items is expanding rapidly.

The present invention relates to one such item and is directed particularly toward a device which may be used to easily and readily refine any one of the variety of herbs. The device of the present invention is inexpensive to manufacture, easy to use and capable of separating twigs, seeds and other roughage from herbal substances of the type discussed above in a singularly effective and convenient manner.

SUMMARY OF THE INVENTION

Briefly, the present invention may be described as a device for refining herbage comprising a hollow cylinder, a wire mesh screen acting as a strainer fixedly mounted within the cylinder and extending transversely thereacross to divide the cylinder into a first and a second chamber, and a plurality of generally spherical balls loosely confined within the first of the chambers. In the use of the device, the herbage which is to be refined is first placed in the first chamber together with the spherical balls. The device is then vigorously agitated and as a result refined herbage will be collected in the second chamber after having been strained through the wire mesh screen.

The device may contain between three and six spherical balls with four being the preferred number. Furthermore, the wire mesh screen may have a mesh size of between 8 and 12 with 10 being the preferred mesh. The screen should be made of wire having a gauge of between 20 and 35 with 25 being the preferred gauge. The balls may be sized with a diameter of between ⅜ of an inch to ½ of an inch with 7/16 of an inch being the preferred size.

The hollow cylinder is preferably formed of a clear acrylic plastic with an inside diameter of about two inches. The balls may be of steel and wire mesh screen of stainless steel.

If the various parameters of the device are properly maintained within suitable limits, a very effective refining operation will be achieved with a relatively inexpensive device producing results not heretofore attainable as conveniently or as inexpensively with devices previously known.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
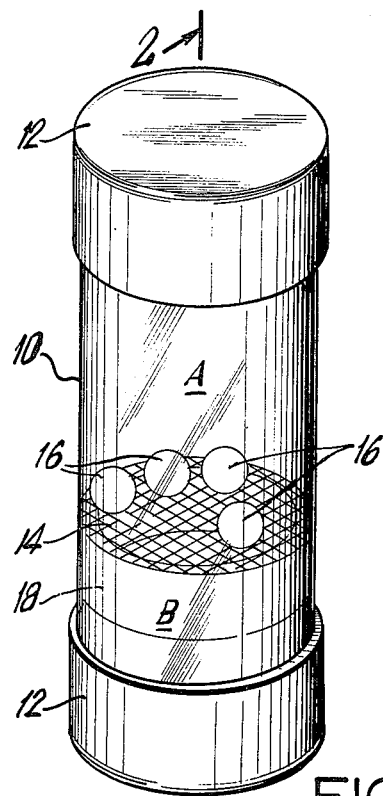
FIG. 1 is a perspective view of a first embodiment of the device of the present invention.
Figure 2:
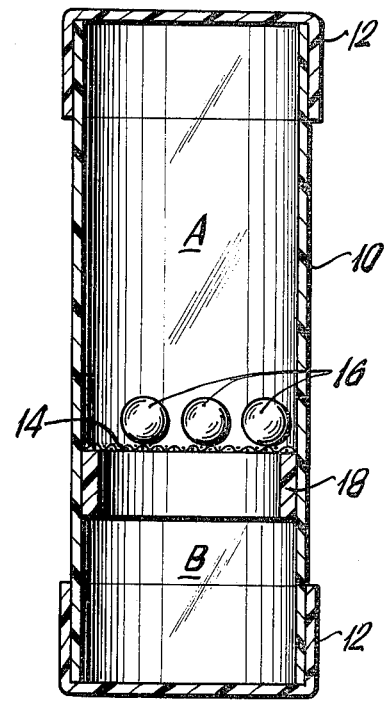
FIG. 2 is a sectional view taken along the line 2—2 of FIG. 1.

Referring now to the drawings, wherein like reference numerals refer to similar parts throughout the various figures thereof, and more particularly the FIGS. 1 and 2. The device of the present invention is depicted as comprising a hollow cylindrical body 10 preferably made of transparent acrylic plastic with a pair of interchangeable end caps 12 being removably fitted to enclose the opposite ends of the cylinder 10. Fixedly mounted within the cylinder is a strainer means in the form of a wire mesh screen 14 which divides the interior of the cylinder into a first chamber A and a second chamber B. Loosely confined within the chamber A on one side of the metal screen 14 are four metallic balls 16. Although in the preferred embodiments of the invention depicted in FIGS. 1-4, four balls 16 are shown, it is to be understood that the device may comprise between three and six balls. Furthermore, balls depicted in the drawings have a diameter of about 7/16 of an inch. this is the preferred embodiment of the invention but the ball diameter may vary between ⅜ of an inch and ½ of an inch.

The wire mesh screen 14 shown in the drawings has a mesh number of 10 and is formed from wire whose gauge number is 25. However, it should be understood that the mesh of the screen may be between 8 and 12 and that the gauge of the wire may be between 20 and 35.

The inside diameter of the cylinder 10 is about two inches but it will be understood that in order to provide an effective straining or refining function for the device the various parameters set forth above may be varied depending on circumstances. However, if the limits of these parameters are maintained as indicated, it will be found that a highly advantageous result not otherwise obtainable with prior art devices may be achieved.

In the operation of the device, the herbage which is to be refined is placed within the chamber A together with the balls 16 by simply removing the upper cap 12 covering the chamber A. It will be understood that the cap 12 is maintained in place with a slight frictional engagement about the exterior of the cylinder 10 and that the cap may be easily removed by manual manipulation thereof. Of course, the fit of the cap 12 should be such as to maintain the chamber A closed when the device of the present invention is vigorously agitated to cause the balls 16 and the herbage contained within the chamber A to be thrown randomly about within the chamber A.

After the herbage has been inserted into the chamber A and after the cap 12 enclosing the chamber A has been replaced, the device of the invention is vigorously agitated by manual shaking with both caps 12 in place. As a result of this agitation, part of the herbage contained within the chamber A will pass through the wire mesh screen 14 and into the chamber B and will accumulate within the bottom cap 12. The portion of the herbage which is passed through the screen will be the refined portion of the herbage and will constitute the portions more suitable for use. Roughage such as twigs, seeds and the like will be retained within the chamber A and they may be discarded after sufficient vigorous shaking of the device has been effected.

After sufficient shaking, the cap 12 closing chamber B may be removed and the refined herbage will be collected within this cap and may be thereby readily used by simply removing it from the cap.

The mode of operation depicted above may, of course, be repeated as many times as may be desired simply by adding new unrefined herbage into the chamber A together with the balls 16 and by again vigorously shaking or agitating the device either manually or by any other appropriate means.

The caps 12 may, if desired, be formed in the manner depicted to effect a frictional engagement with the outer walls of the cylinder 12. Of course, it will be apparent that many other types of caps may be used within the knowledge of those skilled in the art, such as for example, hinge caps or caps which are otherwise fastened or which may be locked in place and readily opened as desired.

In the embodiment of the invention depicted in FIGS. 1 and 2, the cylinder 10 is shown to comprise a generally integrally formed member. Within the cylinder there is located an annular ring 18 which may be heat sealed, glued or otherwise adhered to the inner wall of the cylinder 10. The wire mesh screen 14 is placed above the ring 18 and it may be likewise attached to the ring 18 by any suitable means such as by utilization of an appropriate adhesive. It will be noted that the wire mesh screen 14 is formed as a generally circular disc-like body and after the ring 18 has been inserted within the cylinder 10 and glued or otherwise adhered in place, the screen 14 may be subsequently inserted into the cylinder and then attached to the ring 18 so that it may be firmly affixed within the cylinder 10. Of course, the screen 14 and the ring 18 may first be joined together while they are located externally of the cylinder 10 and they may be subsequently inserted within the cylinder and adhered in place in any appropriate manner, as indicated previously.

As shown in FIGS. 1 and 2, the screen 14 is located closer to one end of the cylinder 10 so the chamber A is made of a size somewhat larger than the chamber B. This is due to the fact that the unrefined herbage will generally occupy the greater volume than the refined herbage and it is found convenient to form the chamber A of a larger size than the chamber B.

Figure 3:
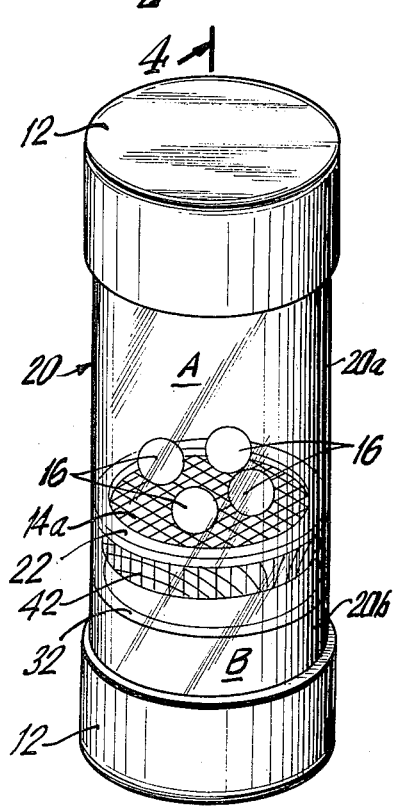
FIG. 3 is a perspective view of a second embodiment of the invention.
Figure 4:
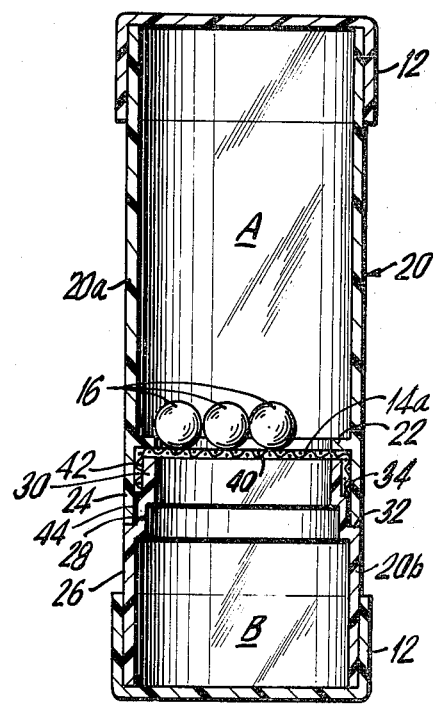
FIG. 4 is a sectional view taken along the line 4—4 of FIG. 3.

A second embodiment of the invention is depicted in FIGS. 3 and 4. This embodiment differs from the embodiment of FIGS. 1 and 2 principally with regard to the manner in which the wire mesh screen is mounted. In the embodiment of FIGS. 3 and 4 the cylindrical body of the invention is formed in two parts 20a and 20b. 20a forms the upper cylindrical portion of the cylinder body within which the chamber A is defined and 20b forms the lower cylindrical portion within which the chamber B is formed. Part 20a has integrally formed therewith an annular flange 22 which extends completely around the inner wall of the part 20a. Extending downwardly below the flange 22 is a skirt portion 24.

The part 20b is formed with a stepped configuration including three cylindrical walls of different diameter, these walls being identified by reference numerals 26, 28 and 30. Between each of the walls there is formed a shoulder 32 and 34 with the shoulder 32 being formed between the walls 26 and 28 while the shoulder 34 is formed between the walls 28 and 30.

The wire mesh screen 14a of the embodiment of FIGS. 3 and 4 is formed in a cup-shaped configuration and includes a disc-shaped portion 40 and a depending annular skirt 42.

In the assembly of the embodiment of FIGS. 3 and 4, the cup-shaped wire mesh screen 14a is placed over the cylindrical part 20b so that the skirt 42 encircles the cylindrical wall 30. Subsequently, the part 20a is placed over the part 20b and over the wire mesh screen 14a so that the flange 22 rests upon and presses down on the cylindrical disc 40 of the wire mesh screen 14a. With the upper cylindrical part 20a in position, it will be seen that the depending skirt 42 of the wire mesh screen 14a will be held between the depending sirt 24 of the cylindrical part 20a and the cylindrical wall 30 of the part 20b.

Furthermore, with the parts in the assembled condition seen best in FIG. 4, the lower part of the depending wall 24 will be in abutting relationship with the cylindrical wall 28. By application of a suitable adhesive 44 between these two parts the entire assembly may be joined together with the wire mesh screen 14a securely held in place between the walls 30 and 42 and the flange 22.

The embodiment of FIGS. 3 and 4 is used in precisely the same manner as the embodiment of FIGS. 1 and 2 and the same description is applicable with regard thereto. The basic difference is with regard to the structure and arrangement of the cylindrical body which forms the base member of the device and the manner in which the wire mesh screens are mounted. The embodiment of FIGS. 3 and 4 is considered to involve a simpler assembly procedure although the basic structure of the component parts may appear somewhat more complex.

It will be seen that when the parts 20a and 20b are placed in the assembled condition they will form a composite cylindrical body 20 which is basically similar to the cylindrical body 10 of FIGS. 1 and 2. However, the mounting of the screen 14a will be somewhat more secure than the mounting of the screen 14 and while in the assembly of the device of FIGS. 1 and 2, the annular ring 18 and the screen 14 must be inserted within the cylindrical body 10, a simpler insertion and assembly procedure pertains with regard to the embodiment of FIGS. 3 and 4.

It has been found that in use the device of the present invention gives superior results with regard to the refining of the herbal substances. Of course, it will be obvious that the parameters discussed above with regard to wire mesh and wire gauge of the strainer means 14 or 14a and with regard to the size and number of the balls 16 must be maintained within reasonable limits if satisfactory results are to be achieved. It has been found that, a preferred embodiment of the invention is obtained when the mesh of the strainer 14 or 14a is 10 and when the gauge of the wire used in making the screen is 25. With an inside diameter for the cylindrical body 10 or 20 of approximatately two inches and by utilizing four spherical balls 16 each having a diameter of 7/16 of an inch particularly advantageous and unusually good results are achieved.

While specific embodiments of the invention have been shown and described in detail to illustrate the application of the inventive principles, it will be understood that the invention may be embodied otherwise without departing from such principles.

What is claimed is:

1. A device for refining herbage comprising a hollow cylinder, strainer means fixedly mounted within said cylinder and extending transversely thereacross to divide said cylinder into a first and a second chamber, and a plurality of generally spherical balls loosely confined within said first chamber, said device operating upon placement of herbage in said first chamber together with said balls and upon subsequent agitation of said device to collect refined herbage in said second chamber after passage thereof from said first chamber through said strainer means, wherein said hollow cylinder is formed in a first and a second part, said second part having a stepped configuration with a first cylindrical wall of smallest diameter, a second cylindrical wall of intermediate diameter and a third cylindrical wall of largest diameter; wherein said strainer means is formed in a cup-shaped configuration arranged to be slidably emplaceable and to fit over said first cylindrical wall; and wherein said first part of said hollow cylinder is formed with a diameter generally coinciding with the diameter of said third cylindrical wall and fitted over said second cylindrical wall to hold said strainer means against said first cylindrical wall, said first part of said hollow cylinder also comprising an annular flange extending completely thereabout and located to press said strainer means against said first cylindrical wall when said first and said second parts of said hollow cylinder are assembled together.

2. A device according to claim 1 wherein said strainer means comprises a wire screen having a mesh of between about 8 and 12 and made from wire of between about 20 to 35 gauge.

3. A device according to claim 1 wherein said hollow body is made of transparent acrylic material, said balls are made of steel, and said screen is made of stainless steel.

4. A device according to claim 1, wherein said openings are at the ends, and said means for closing said openings are end caps each enclosing one of said ends.

* * * * *